United States Patent
Grant et al.

(10) Patent No.: US 10,068,721 B2
(45) Date of Patent: Sep. 4, 2018

(54) HOT SWAP CIRCUIT

(71) Applicant: Cisco Technology, Inc., San Jose, CA (US)

(72) Inventors: Michael Robert Grant, San Jose, CA (US); Yang Li, San Jose, CA (US); Jessica Leigh Kiefer, San Jose, CA (US); Kan Chiu Seto, Saratoga, CA (US); Shobhana Punjabi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/498,999

(22) Filed: Apr. 27, 2017

(65) Prior Publication Data
US 2017/0229257 A1   Aug. 10, 2017

Related U.S. Application Data

(63) Continuation of application No. 14/824,282, filed on Aug. 12, 2015, now Pat. No. 9,665,164.

(51) Int. Cl.
*H01H 9/54* (2006.01)

(52) U.S. Cl.
CPC ..................................... *H01H 9/54* (2013.01)

(58) Field of Classification Search
CPC .... G06F 1/3287; G06F 1/3296; H02J 7/0014; H02J 7/0016; H02J 7/0022; H02J 7/0024; H02J 7/0042; H02J 7/0052
See application file for complete search history.

(56) References Cited

U.S. PATENT DOCUMENTS

| | | | |
|---|---|---|---|
| 5,680,300 A | 10/1997 | Szepesi et al. | |
| 6,031,702 A | 2/2000 | Williams | |
| 6,434,028 B1* | 8/2002 | Takeuchi | H02M 3/07 327/534 |
| 7,049,796 B2 | 5/2006 | Cherniski et al. | |
| 7,324,316 B2 | 1/2008 | Chen et al. | |
| 8,331,110 B2 | 12/2012 | Xu et al. | |
| 8,645,753 B2 | 2/2014 | Yang et al. | |
| 9,667,139 B2* | 5/2017 | Giuliano | H02M 3/155 |
| 2006/0164868 A1 | 7/2006 | Weber | |
| 2009/0278520 A1* | 11/2009 | Perreault | H02M 3/07 323/282 |

(Continued)

OTHER PUBLICATIONS

International Rectifier; PD-95050C; IRFP2907PbF; HEXFET® Power MOSFET; Aug. 8, 2011; pp. 1-9.

(Continued)

*Primary Examiner* — Emily P Pham
(74) *Attorney, Agent, or Firm* — Parker Ibrahim & Berg LLP; James M. Behmke; Stephen D. LeBarron

(57) ABSTRACT

In one embodiment, a hot swap circuit is disclosed. The hot swap circuit includes a first switch connected to a power input line. The hot swap circuit also includes a first capacitor connected to the first switch that is charged when the first switch is closed. The hot swap circuit further includes a second switch connected to the first switch and the first capacitor. The hot swap circuit additionally includes an input capacitor connected to the second switch and located in parallel with an input line to a power system. When the second switch is closed, the input capacitor is charged.

12 Claims, 6 Drawing Sheets

(56) References Cited

U.S. PATENT DOCUMENTS

| 2010/0085786 | A1* | 4/2010 | Chiu | H02M 3/07 |
|---|---|---|---|---|
| | | | | 363/59 |
| 2011/0309809 | A1 | 12/2011 | Rao et al. | |
| 2015/0194811 | A1* | 7/2015 | Mao | H02J 7/025 |
| | | | | 307/104 |
| 2016/0313783 | A1 | 10/2016 | Li et al. | |

OTHER PUBLICATIONS

Marcus O'Sullivan; "Understanding Hot Swap: Example of Hot-Swap Circuit Design Process"; vol. 42; May 2008; pp. 1-8.

* cited by examiner

HOT SWAP CIRCUIT

RELATED APPLICATION

The present application is a Continuation application of U.S. patent application Ser. No. 14/824,282, filed Aug. 12, 2015, entitled "HOT SWAP CIRCUIT", by Michael Robert Grant et al., the contents of which is hereby incorporated by reference

TECHNICAL FIELD

The present disclosure relates generally to electronic devices, and, more particularly, to a hot swap circuit.

BACKGROUND

Many devices, such as networking and computing devices (e.g., servers, switches, disk arrays, etc.), require the ability to update or replace faulty equipment without interrupting the functioning of the rest of the system. For example, a device may have a backplane to which a number of removable computing modules can be coupled. During operation of the device, modules may be added, removed, or replaced, as needed (e.g., to increase functionality of the device, to replace a failing module, etc.). However, inrush currents when making such changes may be relatively high. To protect against such currents, a hot swap circuit may be used to regulate the inrush current to a module while making changes to the modules of the device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
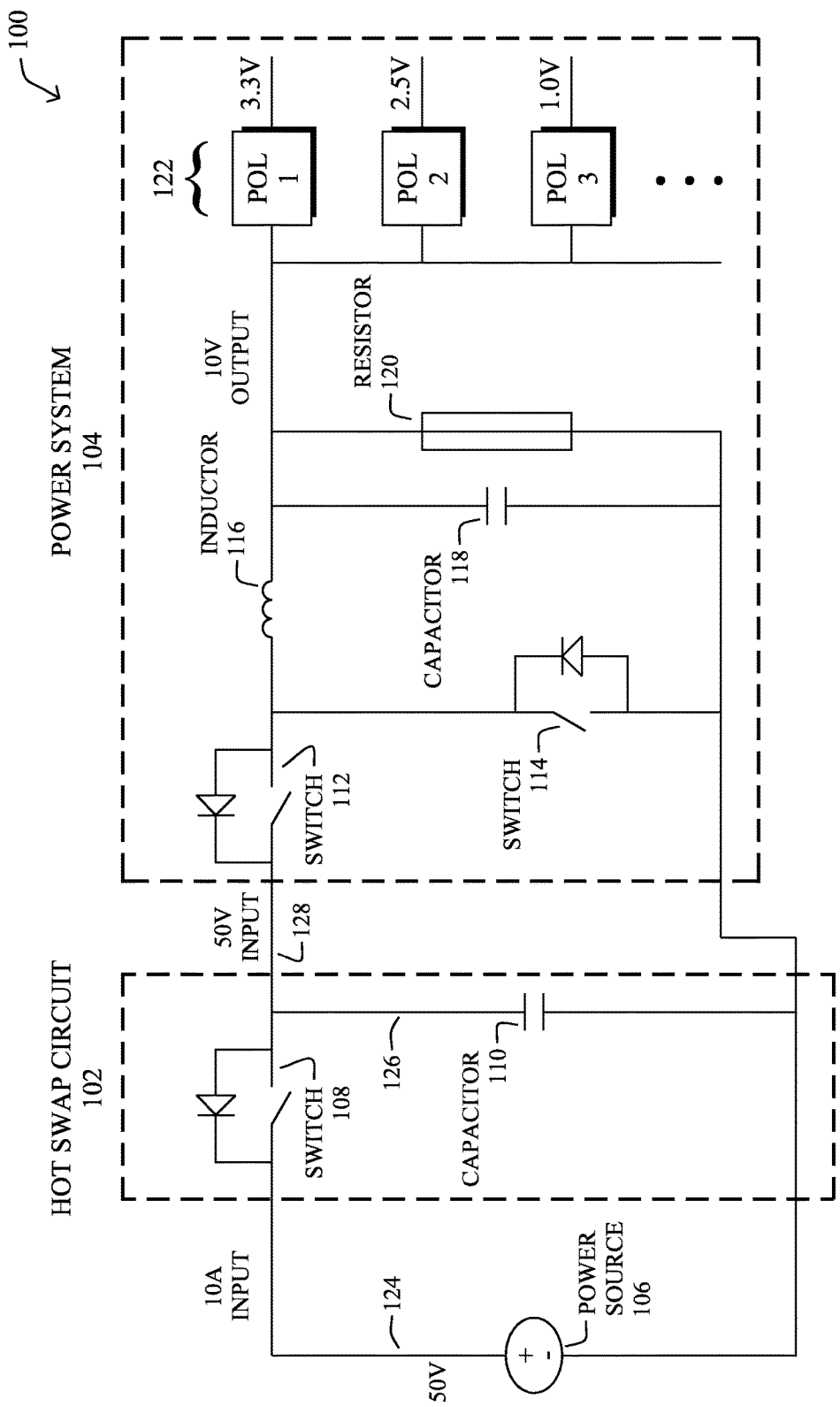
FIG. 1 illustrates an example hot swap circuit.

According to one or more embodiments of the disclosure, a hot swap circuit is disclosed. The hot swap circuit includes a first switch connected to a power input line. The hot swap circuit also includes a first capacitor connected to the first switch that is charged when the first switch is closed. The hot swap circuit further includes a second switch connected to the first switch and the first capacitor. The hot swap circuit additionally includes an input capacitor connected to the second switch and located in parallel with an input line to a power system. When the second switch is closed, the input capacitor is charged.

In further embodiments, a method is disclosed. The method includes closing a first switch in a hot swap circuit to charge a first capacitor connected to the first switch. The method also includes opening the first switch. The method further includes closing a second switch in the hot swap circuit to transfer charge from the first capacitor to an input capacitor connected to the second switch and located in parallel with an input line to a power system, while the first switch is held open. The method additionally includes closing the first and second switches after a predefined period of time, to complete charging of the input capacitor to a final input voltage level.

In other embodiments, a hot swap circuit is disclosed. The hot swap circuit includes first storage means for storing charge supplied by a power supply. The hot swap circuit also includes second storage means for storing an input voltage to be supplied to a power system. The hot swap circuit further includes means for transferring charge from the first storage means to the second storage means.

DESCRIPTION

Various hot swap circuit designs are provided herein that are operable to protect against large inrush currents, such as when a hardware module is plugged into a live computing device. In some aspects of the teachings herein, inrush of a current to a bulk capacitor of a hot swap circuit may be prevented via intermediary circuitry. Such intermediary circuitry may include, for example, an intermediary capacitor and/or inductor, to trickle charge the input bulk capacitor for the hot swap circuit. Doing so may allow for the use of smaller switches, Referring now to FIG. 1, an example hot swap circuit is shown, according to some embodiments. As shown, system 100 may generally include a power system 104 and a hot swap circuit 102 powered by a power source 106. In general, hot swap circuit 102 may operate to prevent a large inrush current from power source 106 during a startup event (e.g., a new module is plugged into a running computing device, etc.). Power system 104 may work in conjunction with hot swap circuit 102 to step down the supplied voltage from power source 106 and hot swap circuit 102 into a lower voltage that may be adjusted into any number of different output voltages by point of load converters (POLs) 122 (e.g., a first POL, a second POL, etc.).

In various embodiments, power system 104 may include a switch 112 in series with the input line 128 to power system 104 and an inductor 116 coupled to switch 112. Running parallel off of input line 128 to power system 104 are switches 114, capacitor 118, and a resistor 120. Switches 112 and 114 may comprise MOSFETs or other suitable components that are operable to control the flow of current through power system 104. As would be appreciated by one skilled in the art, switches 112-114, inductor 116, capacitor 118, and resistor 120 may be sized accordingly, to step down the input voltage provided to power system 104 via line 128 to a lower voltage, as desired. For example, as shown, the components of power system 104 may be operable to step down a 50V input voltage to a 10V output voltage provided to POLs 122. For example, inductor 116, capacitor 118, and resistor 120 may form an RLC low-pass filter and may be sized according to a desired corner frequency ($\omega_c$) and damping factor ($\zeta$) as follows:

$$\omega_c = \frac{1}{\sqrt{LC}}$$

$$\varsigma = \frac{1}{2R}\sqrt{\frac{L}{C}}$$

where L is the inductance of inductor 116, R is the resistance of resistor 120, and C is the capacitance of capacitor 118.

As noted previously, POLs 122 may be operable to provide voltage to any number of different loads (e.g., pins, other electrical connectors, etc.). In one embodiment, POLs 122 may comprise a voltage divider that divides the resulting output voltage from switches 112-114, inductor 116, capacitor 118, and resistor 120. For example, assume that power source 106 supplies 50 Volts (V) at 10 Amperes (A) within system 100. In such a case, 50V may be supplied to power system 104 via input line 128. In turn, power system 104 may step down the 50V to 10V or any other lower voltage. In turn, POLs 122 may be configured to convert the resulting 10V into the desired load voltages (e.g., the first POL may output a voltage of 3.3V, the second POL may output a voltage of 2.5V, the third POL may output a voltage of 1.0V, etc.). In other embodiments, other step down circuits may be used in power system 106, to convert the input voltage on input line 128 of power system 104 to a lower voltage.

In the example shown in FIG. 1, hot swap circuit 102 may include a switch 108 in series with power source 106 along power input line 124. A control signal may be provided to switch 108 to actuate switch 108. For example, a microcontroller or other control circuitry (not shown) may provide a control signal to switch 108 to open or close switch 108. Hot swap circuit 102 may also include an input capacitor 110 located along line 126 that is in parallel to input line 128 of power system 106. Since power system 106 and other similar step down circuits do not have inductors directly at their power inputs, capacitor 110 may be relatively large, to filter the voltage ripple in system 100. For example, capacitor 110 may be a 47 micro Farad (μF), aluminum electrolytic capacitor, if the voltages and currents shown are used. Other sizes of capacitor 110 may also be used, if other voltages and currents are used. In one embodiment, switch 108 may comprise a MOSFET of suitable properties, although other switching mechanisms may also be used, in further embodiments.

Figure 2:
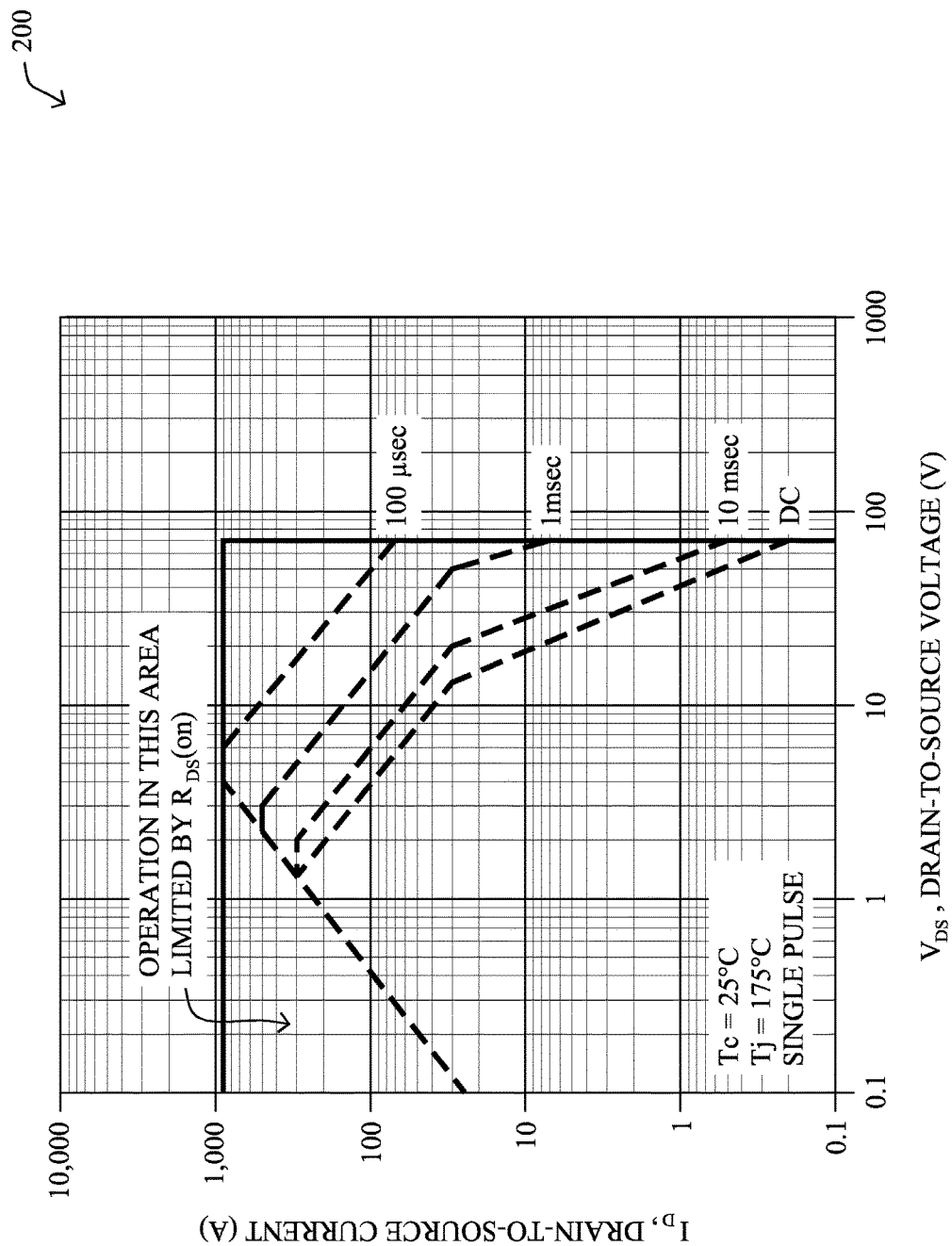
FIG. 2 illustrates an example graph of the maximum safe operating area (SOA) of a transistor.

Referring now to FIG. 2, an example graph of the maximum safe operating area (SOA) of a transistor is shown, according to one embodiment. As shown, graph 200 depicts the time-varying operational responses of an exemplary MOSFET that may be used for switch 108 in hot swap circuit 102. In particular, graph 200 maps the drain-to-source current ($I_D$) for an exemplary MOSFET to its drain-to-source voltage ($V_{DS}$) as a function of time, thereby defining the minimum SOA for the MOSFET. This mapping is shown on a logarithmic scale and assumes several conditions for the MOSFET such as a single input pulse and the temperature range of the device. For example, one exemplary MOSFET that may exhibit the behavior shown in graph 200 is the IRFP2907PBF power MOSFET by International Rectifier™. Other transistors may also be used, in other embodiments.

While hot swap circuit 102 may be operable to provide protection against inrush currents during a startup event, several observations can be made with respect to graph 200 and switch 108. First, switch 108 may require a longer turn on time, to ensure there is no inrush current to system 100 during a startup event. For example, the turn on time for switch 108 may be 10 milliseconds (ms) or even higher, depending on the implementation. Second, from graph 200, the $I_D$ currents within the SOA for the exemplary MOSFET decrease as the $V_{DS}$ voltages and turn on times increase.

Thus, a number of challenges exist with respect to hot swap circuit designs that rely on a single FET acting as a variable resistor to limit the inrush current into the bulk input capacitor(s) of the circuit. Notably, such designs require the FET to have adequate SOA performance, to survive the power dissipation on startup, while simultaneously having a resistance low enough to safely pass the board's maximum current draw after the board has booted up. To satisfy both conditions, the single FET must be relatively large. In addition, the stress on the FET caused by this power dissipation necessitates careful regulation and monitoring to ensure that the FET does not get damaged. As board power increases, the size and complexity of the hot swap circuit also increases, making simpler and more scalable solutions of interest.

Figure 3:
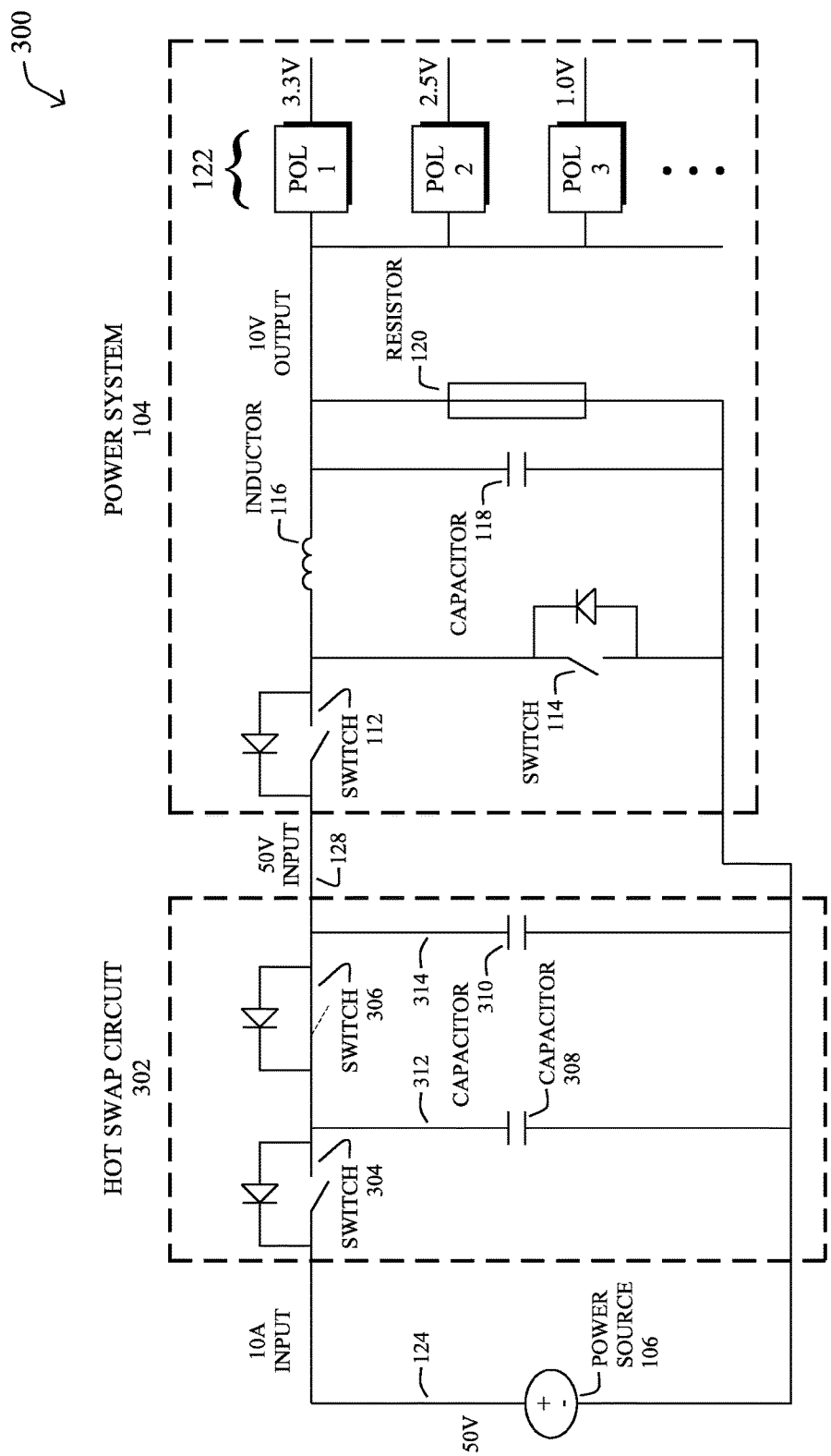
FIG. 3 illustrates another example hot swap circuit.

Referring now to FIG. 3, another example hot swap circuit is shown, according to various embodiments. As shown, assume that system 300 includes the same power system 104 and power source 106 as that of system 100. However, system 300 shown may include a hot swap circuit 302 having a different configuration than that of hot swap circuit 102. Notably, whereas hot swap circuit 102 has a single switch 108 in series with power source 106 along power input line 124, hot swap circuit 302 instead includes a first switch 304 and a second switch 306 located along the same line 124. In various embodiments, hot swap circuit 302 also includes a first capacitor 308 located along a first line 312 and a second capacitor 310 located along a second line 314. Capacitors 308 and 310 may each be single capacitors or, alternatively, capacitors that are in parallel along lines 312, 314. As would be appreciated, capacitors in parallel may act as a single capacitor having a capacitance equal to the sum of the capacitances of the capacitors. In other embodiments, either or both of capacitors 310, 312 may comprise capacitors in series.

During operation, both switches 304 and 306 may be held open initially, thereby preventing power from power source 106 from being transferred into hot swap circuit 302, until hot swap circuit 302 is ready to be charged. At such a time, switch 304 may be closed first, while holding switch 306 open. In doing so, first capacitor 308 may be charged up to a charged voltage level (e.g., based on the voltage of power source 106). For example, if power source 106 supplies 50V (e.g., as a backplane voltage), first capacitor 306 may be charged based on this voltage, when switch 304 is closed. Any number of other positive and/or negative voltages and/or currents may be supplied by power source 106, in other embodiments.

Once the voltage across first capacitor 308 reaches its desired charge, capacitor 308 effectively acts as an open circuit at which point switch 304 may be opened. Subsequent to re-opening switch 304, switch 306 may be closed. Once this occurs, the stored energy in capacitor 308 may be transferred into capacitor 310, the bulk input capacitor for input line 128 to power system 104.

In various embodiments, switches 304 and 306 may alternately be opened and closed any number of times, to charge input capacitor 310 to a desired voltage level. In other words, the basic principle of operation of hot swap circuit 302 is to slowly transfer energy first from power source 106 to capacitor 308 and then from capacitor 308 to input capacitor 310 by alternate operation of switches 304-306.

The intermediate capacitor 308 may be of much smaller capacitance than that of input capacitor 310 which, consequently, also means that capacitor 308 may be much smaller physically than that of capacitor 310. Notably, inrush current (i) in hot swap circuit 302 be calculated as follows:

$$i = C\frac{dv}{dt}$$

where C is the capacitance of capacitor 308 and dv/dt is the rate of voltage change. Thus, if all other design parameters remain the same, a much smaller value for C will result in a smaller inrush current in direct proportion to how small of a capacitance is selected for capacitor 308. For example, in some embodiments, capacitor 310 may be an aluminum electrolytic capacitor having a capacitance on the order of a few hundred microfarads (e.g., 100 μF, 200 μF, 300 μF, etc.). In such cases, capacitor 308 may be selected to have a capacitance of only a few hundred pF or nF. Notably, if the capacitance of capacitor 310 is on the order of several hundred microfarads and capacitor 308 has a capacitance of several hundred pF, the inrush current into capacitor 308 will be approximately 1,000,000 times smaller, given the same dv/dt.

Figure 4:
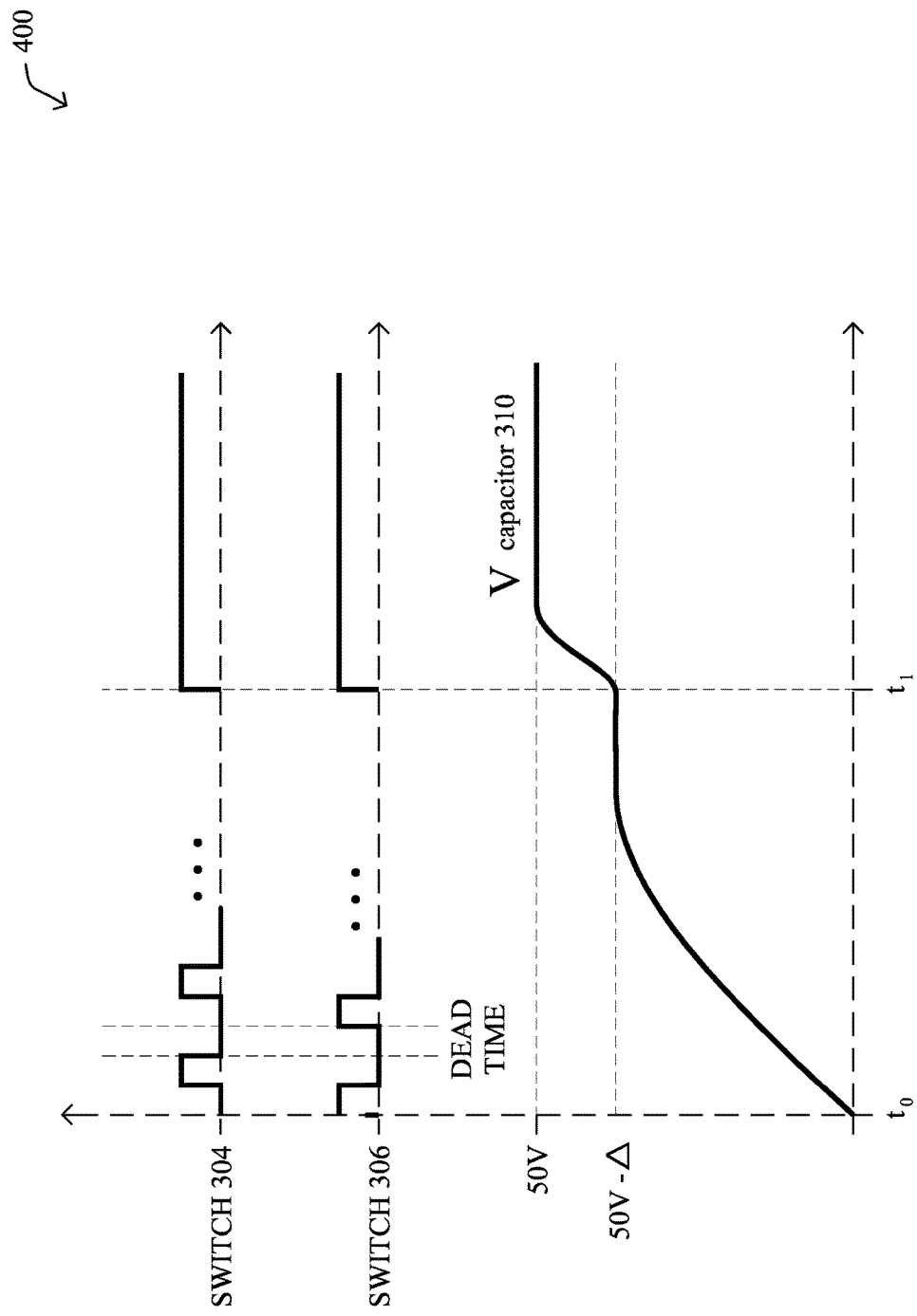
FIG. 4 illustrates an example graph illustrating the operation of the hot swap circuit of FIG. 3.

Referring now to FIG. 4, an example graph illustrating the operation of the hot swap circuit of FIG. 3 is shown, according to various embodiments. As shown, switches 304 and 306 may be alternately opened and closed via separate control pulses provided to the switches during an initial period of time (e.g., between times $t_0$ and $t_1$). In various embodiments, the control circuitry for these pulses may include, but is not limited to, piezoelectric timers, integrated circuit (IC) timers, flip-flops, microprocessors, application-specific ICs (ASICs), or the like.

The control pulse supplied to switches 304 and 306 may be alternated at a high enough frequency, to build up a charge across capacitor 310, as shown. In various embodiments, a dead time may be used between the pulses, to ensure that there is no overlap of the pulses during time period $t_0$-$t_1$. In other words, the dead times may correspond to periods of time during which both of switches 304 and 306 are held open. For example, assume that the pulse sent to switch 304 has an initial delay of 10 μs, is on for 9 μs, has rise times and fall times of 10 ns, and a total period of 20 μs. In such a case, the pulse sent to switch 306 may use the same parameters, but may have an initial delay of 20μ, to ensure that the pulses sent to switches 304 and 306 do not overlap, according to one example. Other parameters for the pulses may be used in other embodiments, to ensure that both switches 304, 306 are not closed simultaneously at any point between times $t_0$-$t_1$.

During time period $t_0$-$t_1$, the voltage across input capacitor 310 will asymptotically approach that of power source 106. Notably, capacitor 308 will be charged by power source 106 when switch 304 is closed. Then, after switch 304 is opened and switch 306 is subsequently closed, the stored energy in capacitor 308 will be transferred to input capacitor 310. This process may be repeated any number of times during times $t_0$-$t_1$. By using a much smaller capacitor for capacitor 308 than that of capacitor 310, the inrush current may also be limited significantly, allowing switches 304-306 to also be reduced in size.

At some point in time, such as at time $t_1$ or shortly thereafter, the voltage of input capacitor 310 will be nearly equal to that of power source 106 (e.g., within some small Δ of power source 106) and the risk of inrush current will be minimal. From this point forward, the control of switches 304 and 306 may begin a second mode of operation whereby both of switches are then closed at the same time, to complete the charging of capacitor 310 to its final voltage input level (e.g., 50V, etc.). In other words, after time $t_1$, switches 304-306 may both be closed, to directly connect input capacitor 310 to power source 106.

Figure 5:
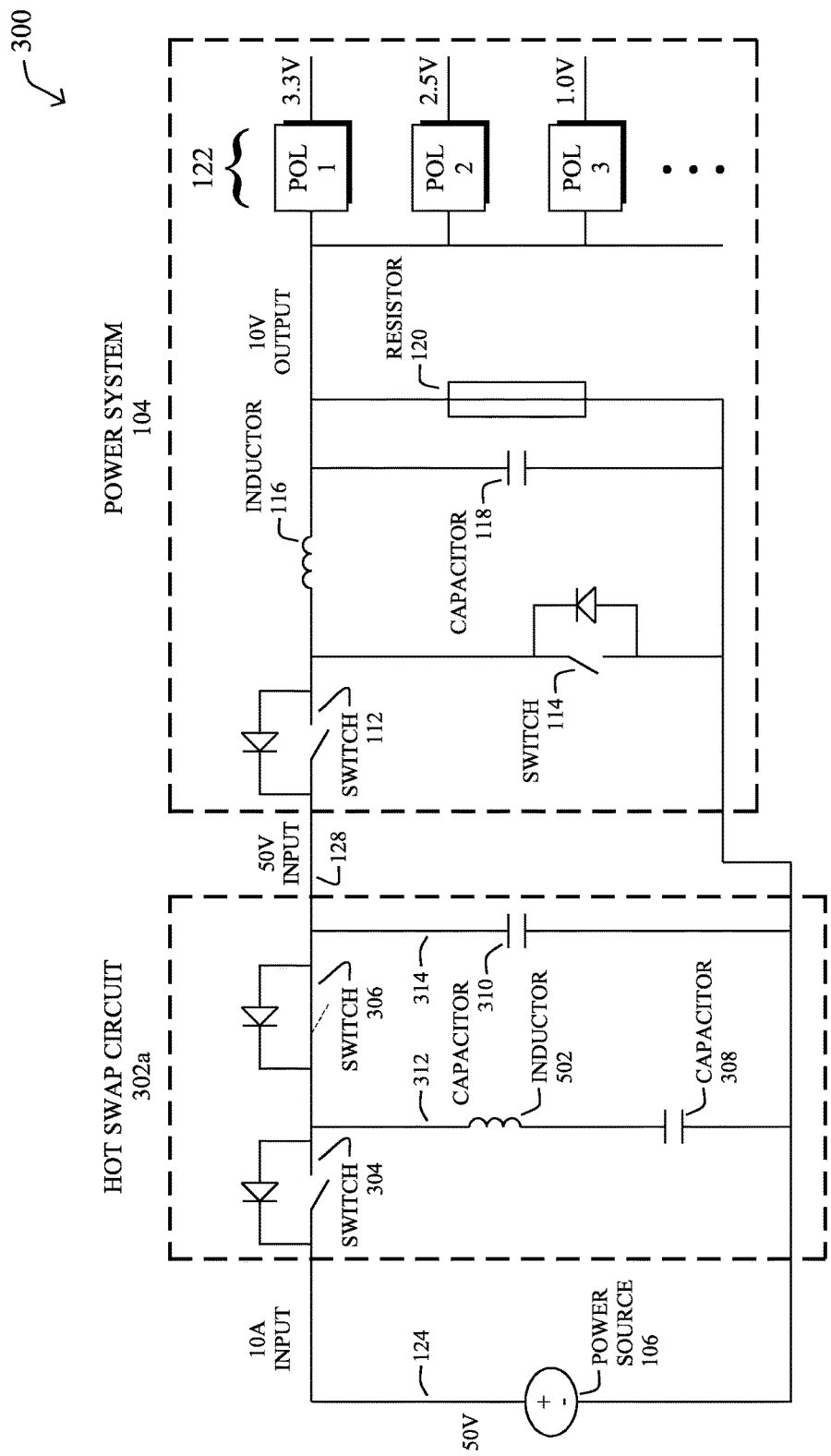
FIG. 5 illustrates another example hot swap circuit.

Referring now to FIG. 5, a further example hot swap circuit 302a is shown, according to various embodiments. As shown, hot swap circuit 302a may have a similar configuration and operation as that of hot swap circuit 302 shown in FIG. 3. However, hot swap circuit 302a may also include an inductor 502 in series with capacitor 308 along line 312. As would be appreciated, inductor 502 may be a single inductor, multiple inductors in series (e.g., thereby adding the inductances of the inductors), or in parallel, in various embodiments.

The addition of inductor 502 in hot swap circuit 302a may allow for greater control of the inrush current to capacitor 308. Notably, the relationship between inductance, voltage, and current is as follows:

$$V = L\frac{di}{dt}$$

where V is the voltage across inductor 502, L is the inductance of inductor 502, and di/dt is the rate of change of the current through inductor 502. Rearranging this equation gives the following:

$$\frac{V}{L} = \frac{di}{dt}$$

where V and L may be selected as desired, to control the current change into and out of capacitor 308. Since inductor 502 is not located along the primary power path of hot swap circuit 302a (i.e., through switches 304, 306), inductor 502 may be very small in size (e.g., 1 μH in series with a 47 nF capacitor, etc.), while still significantly limiting the inrush current.

In contrast to hot swap circuit 102, hot swap circuit 302a allows for switches 304 and 306 to operate outside of the SOA region of that of switch 108. Notably, if switch 108 is a MOSFET, it may take several milliseconds to turn on, consuming power the entire time. In addition, since the inrush current is relatively large in hot swap circuit 102, switch 108 must be sized accordingly. However, in hot swap circuits 302 and 302a, the inrush current is limited by capacitor 308 (and further by inductor 502, if used), allowing switches 304 and 306 to turn on quickly (e.g., on the order of nanoseconds) and to operate outside of the SOA region. Thus, switches 304 and 306 may be much smaller FETs than that of switch 108, thereby simplifying the construction of the hot swap circuits and allowing for the use of more readily available components.

Figure 6:
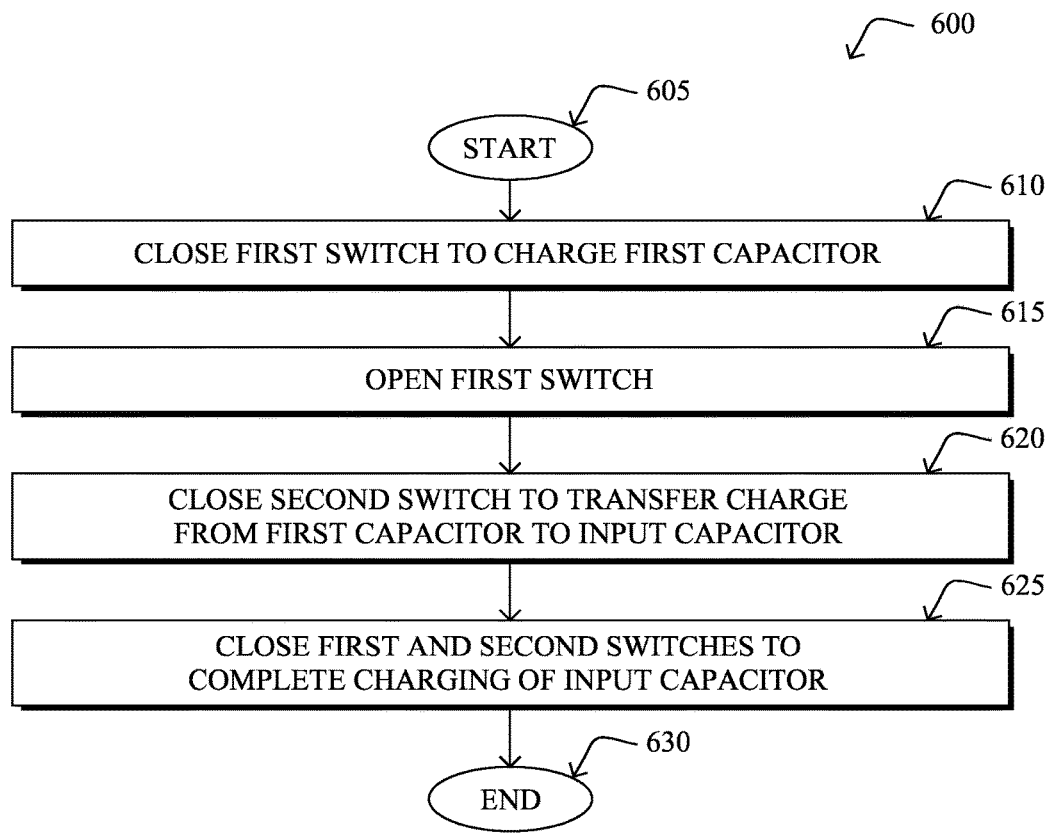
FIG. 6 illustrates an example simplified procedure for operating a hot swap circuit.

Referring now to FIG. 6, an example simplified procedure 600 is shown for operating a hot swap circuit, according to various embodiments. In general, procedure 600 may be performed by one or more microcontrollers, one or more application specific integrated circuits (ASICs), one or more processors executing software, or any other circuitry operable to provide control signals to the switches of a hot swap circuit (e.g., switches 304-306 described above, etc.). Procedure 600 may begin at step 605 and continue on to step 610 where, as described in greater detail above, a first switch of a hot swap circuit may be closed to charge a first capacitor. For example, as described above, switch 304 may be closed to provide an electrical path from power source 106 to capacitor 308. In some embodiment, a second switch of the hot swap circuit may be held open while the first switch is closed, to allow the electrical energy to accumulate on the first capacitor.

At step 615, as detailed above, the first switch may be opened. In particular, after the first capacitor has been charged, the first switch may be opened, thereby allowing the energy transferred to the first capacitor to remain stored by the first capacitor. During this time, the second switch for the hot swap circuit may also be held open for a dead period of time, in some embodiments.

At step 620, as described in greater detail above, the second switch may be closed, to transfer the energy stored by the first capacitor to be transferred to an input capacitor of the hot swap circuit. For example, as detailed above, switch 306 may be closed at some point after opening switch 304, to transfer the energy stored by capacitor 308 to input capacitor 310. Such an input capacitor may be connected to the second switch and located in parallel to the input line to a power system, such as power system 104.

At step 625, as detailed above, the first and second switches may be closed to complete the charging of the input capacitor. In various embodiments, steps 610-620 may be repeated any number of times, thereby allowing the voltage across the input capacitor to build to a desired threshold voltage level (e.g., near the voltage level of the power source for the hot swap circuit). When the voltage across the input capacitor reaches the desired threshold voltage (e.g., when the threat of a high inrush current is significantly reduced), both switches of the hot swap circuit may be closed, thereby allowing the power source to complete charging the input capacitor to its final voltage level. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques herein, therefore, provide for hot swap circuit designs that do not require large, specialized SOA FETs. Instead, the switches/FETs used in the designs herein may be considerably smaller than SOA-operation FETs, less expensive, and more readily available from suppliers. In addition, the designs herein can be easily scaled for use in higher power boards and do not require complex control circuitry to protect the FET(s) from damage from operating in the sensitive SOA region.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. For example, the size of the components described herein may be sized by one skilled in the art based on the desired source voltage and desired initial voltage drop across the switch of the hot swap circuit, without deviating from the teachings herein. Therefore, it is the object of the appended claims to cover all such variations and modifications as come within the true spirit and scope of the embodiments herein.

What is claimed is:

1. A hot swap circuit comprising:
a first switch connected to a power input line;
a first capacitor connected to the first switch that is charged when the first switch is closed;
a second switch connected to the first switch and the first capacitor; and
an input capacitor connected to the second switch and located in parallel with an input line to a power system, wherein the input capacitor is charged by the first capacitor when the second switch is closed and wherein the first switch and the second switch are controlled to alternately open and close during charging of the input capacitor.

2. The hot swap circuit as in claim 1, further comprising circuitry operable to alternate between closing the first and second switches by:
closing the first switch while holding the second switch open, to charge the first capacitor; and
closing the second switch while holding the first switch open, to transfer charge from the first capacitor to the input capacitor.

3. The hot swap circuit as in claim 2, wherein the circuitry is operable to hold the first and second switches open for a dead period of time, prior to closing either the first switch or the second switch.

4. The hot swap circuit as in claim 2, wherein the circuitry is further operable to:
close both switches, after a predefined period of time.

5. The hot swap circuit as in claim 4, wherein the predefined period of time corresponds to a voltage level to which the input capacitor has been charged, and wherein the input capacitor is charged from the voltage level to a final input voltage level after both switches are closed.

6. The hot swap circuit as in claim 5, wherein the final input voltage is 50 volts.

7. The hot swap circuit as in claim 1, further comprising:
an inductor located in series with the first capacitor between the first capacitor and the first switch.

8. The hot swap circuit as in claim 1, wherein the first capacitor has less capacitance than that of the input capacitor.

9. The hot swap circuit as in claim 1, wherein the first and second switches comprise metal-oxide semiconductor field effect transistors (MOSFETs).

10. The hot swap circuit as in claim 1, wherein the input capacitor is an aluminum electrolytic capacitor.

11. The hot swap circuit as in claim 1, further comprising the power system, wherein the power system is configured to step down an input voltage to one or more lower voltages.

12. The hot swap circuit as in claim 11, wherein the power system comprises:
a plurality of point of load converters.

* * * * *